(12) United States Patent
Piccinini et al.

(10) Patent No.: US 9,112,965 B2
(45) Date of Patent: Aug. 18, 2015

(54) MANAGING CELLULAR PHONE CALLS (75) Inventors: Sandro Piccinini, Rome (IT); Luigi Pichetti, Rome (IT); Marco Secchi, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 13/512,081

(22) PCT Filed: Oct. 20, 2010

(86) PCT No.: PCT/EP2010/065771
§ 371 (c)(1),
(2), (4) Date: May 25, 2012

(87) PCT Pub. No.: WO2011/067030
PCT Pub. Date: Jun. 9, 2011

(65) Prior Publication Data
US 2013/0040602 A1    Feb. 14, 2013

(30) Foreign Application Priority Data

Dec. 2, 2009   (EP) ..................................... 09177700

(51) Int. Cl.
*H04W 4/26* (2009.01)
*H04M 1/2745* (2006.01)
*G06Q 30/04* (2012.01)
*H04M 1/725* (2006.01)
(Continued)

(52) U.S. Cl.
CPC ......... *H04M 1/274566* (2013.01); *G06Q 30/04* (2013.01); *H04M 1/72563* (2013.01); *H04M 15/00* (2013.01); *H04M 15/44* (2013.01); *H04M 15/62* (2013.01); *H04M 15/8033* (2013.01); *H04W 4/24* (2013.01); *H04M 1/274508* (2013.01); *H04M 2250/60* (2013.01)

(58) Field of Classification Search
CPC ....................................................... H04W 4/26
USPC ............ 455/406, 418, 552.1, 127.4, 551, 558
See application file for complete search history.

(56) References Cited

U.S. PATENT DOCUMENTS 5,768,356 A   6/1998   McKendry et al.
6,353,663 B1  3/2002   Stevens et al.
(Continued)

FOREIGN PATENT DOCUMENTS

CN   1149372 A   5/1997
CN   1617502 A   5/2005
(Continued)

*Primary Examiner* — Michael T Vu
(74) *Attorney, Agent, or Firm* — Stephen R. Tkacs; Stephen J. Walder, Jr.; Jeffrey S. LaBaw (57) ABSTRACT

A mechanism is disclosed for managing phone calls on phone devices used by the employee of a company. When the user wants to give a call, a new plugin in the phone device interprets an attribute value added by the phone device user to each phone number in order to categorize the call. The cell phone user enters a profile describing his call accounting information. A call management plugin computes a prefix for user personal calls which will be adapted to the user location. The call management plugin at the end of the call tags the call information as a personal call or business call. The phone device sends the tagged call information to a remote server of the company, which consolidates billing information received from the phone operators with the tagged call information.

17 Claims, 6 Drawing Sheets (51) Int. Cl.
*H04M 15/00* (2006.01)
*H04W 4/24* (2009.01)

(56) References Cited

U.S. PATENT DOCUMENTS

| | | | |
|---|---|---|---|
| 6,925,160 B1 * | 8/2005 | Stevens et al. | 379/121.05 |
| 2002/0042715 A1 | 4/2002 | Kelley | |
| 2003/0134626 A1 | 7/2003 | Himmel et al. | |
| 2004/0259525 A1 | 12/2004 | Kotzin | |
| 2005/0070261 A1 | 3/2005 | Belmont et al. | |
| 2005/0086138 A1 | 4/2005 | Prange | |
| 2009/0017788 A1 | 1/2009 | Doyle et al. | |
| 2009/0149154 A1 | 6/2009 | Bhasin et al. | |
| 2010/0322400 A1 * | 12/2010 | Katzenstein | 379/114.21 |

FOREIGN PATENT DOCUMENTS

| | | |
|---|---|---|
| EP | 0740482 A1 | 10/1996 |
| FR | 2866190 A1 | 8/2005 |
| JP | H0918612 A | 1/1997 |
| JP | 09512143 A | 12/1997 |
| JP | 2002354158 A | 12/2002 |
| JP | 2005072931 A | 3/2005 |
| JP | 2005514870 A | 5/2005 |
| JP | 2006309356 A | 11/2006 |
| JP | 2007274644 A | 10/2007 |
| JP | 2008072409 A | 3/2008 |
| TW | 222307 B | 10/2004 |
| TW | 299146 B | 7/2008 |
| WO | WO 95/28809 | 10/1995 |
| WO | WO 2008/077159 A2 | 6/2008 |

* cited by examiner

MANAGING CELLULAR PHONE CALLS

BACKGROUND

The present invention generally relates to cellular phone call. More particularly the invention aims at managing calls using the prefixed call numbers as supported by most of the cellular phone networks.

There is an increasing need to provide an appropriate billing and accounting of the usage of corporate resources like cellular phones owned by a company and used by its employees. For instance, appropriate chargeback of a company cellular phone may be needed to distinguish between personal usage and business usage. In the case where the distinction between business and personal calls is automatically performed, the employee, during a weekend or in the evening, is free to spend the appropriate amount of time he needs in personal calls. The employee knows that proper accounting will occur, and that he will not have to justify such personal usage of the cell phone to his company, as he is paying for that usage.

An even deeper analysis is required today by the companies. For instance, within the scope of a business usage, a company may also be able to chargeback the specific costs to the different accounts or engagements that his employees are working for.

The U.S. Pat. No. 6,925,160 discloses a central system for receiving billing information of the employee cellular phones from the phone service providers, the central system comprising a rule engine to analyze the information received for particularly distinguishing between usage of the phone for business and personal activities. The billing engine analyzes the billing information sent by the phone service providers and uses employee personal and business inputs information stored in the company databases accessed by the employees. By knowing, for instance, the employee vacation days, calendar entries and a Phone Book with personal and professional phone numbers, the centralized billing application is able to distinguish between personal and business use and also to distinguish between different business activities for a same employee.

Considering the solution of the prior art, it is required to have a more flexible and dynamic way to prepare information of the employee in relation with the phone calls. Even if, at the level of a company, there is always a centralized system to prepare billing of employee phone calls according to the call types, however, the employee information is tedious to be collected particularly because it can change quickly and the usual company databases are not always immediately updated. Also the well known congestion at remote server side bought by a centralized application and system should be avoided especially when the company does invest too much in this domain.

To avoid a Call management centralized solution, most of cellular phone networks today support the calling feature which consists of asking the caller to dial a special code prior to a telephone number so that a special telephone service is started. Particularly, the cell phone user can prefix his/her call with a specific numeric prefix (e.g. 46, for Telecom Italia telecom provider) to distinguish business calls from personal calls. So, for instance, if the employee calls the extension 06.12345678 which has been entered as in his phone number directory, that call will be accounted as a business call, while if the same extension is dialed as 46.06.12345678 that same call is marked as a personal call on the bill sent by the telephone operator to the employee company. When the company receives billing from the telephone operator, it can directly dispatch personal call billing to the employee. There are however limitations to the above approach and service, when offered from a specific phone operator:

Such "personal call" prefix may be different from one operator to another (46 for Telecom Italia, and 9 for Vodafone). This obliges a complete migration of personal telephone numbers, stored in the telephone or sim-card memory, when a company changes his telecom provider.

This "personal call prefixing", usually does not work in roaming situations, especially when the cell-phone is used abroad. So for instance when an Italian user is traveling in the US, or in France, and he wants to make the personal call specified in the example above, he has to dial +39.06.12345678. He cannot dial 46.<national_ext> as the 46 prefix is simply not recognized abroad.

As "personal call prefixing" does not work in roaming situations, users are usually obliged to store double telephone numbers for most dialed personal extensions: one "prefixed" (e.g. 46) to be used within the home country, so that automatic accounting occurs, and one with the international prefix (+39) that will work from abroad, even if that will be handled as a business call. This can be both a boring practice, and a misusage of the limited amount of memory that cell-phone or subscriber identification module (SIM) card offers.

Because of the last point, i.e. that operators do not allow to flag abroad calls as personal, the user will then have to periodically connect to the company billing system, to specify that the 10 calls he made from the US to the number +39.06.12345678, have to be charged as personal calls. This practice may be quite boring as well, but failure to do so may cause improper accounting, incorrect benefits taxation, incorrect reporting of financial results, etc.

Finally the "personal call prefixing" implemented by the operators, when working, is limited to a black&white approach, unable to support more complex chargeback scenarios, like business related calls, to be charged to different accounts or service engagements.

Consequently, it is desirable to distinguish billing of employee cell phone calls between business and personal calls while avoiding the drawbacks of the prior art centralized solution and of the current personal call prefixing service currently implemented by the cell phone operators.

SUMMARY

In one illustrative embodiment a method for managing phone calls is provided. The method comprises reading in a phone book a phone type attribute value appended to a phone number selected for giving a call. The method further comprises reading data from at least one profile associated to the read attribute value. The method further comprises applying at least one rule to the read profile data. The method further comprises, if the attribute value corresponds to a personal call, prefixing a phone number selected for giving a call with a prefix computed according to at least one rule and profile data. The computed prefix is understandable by a phone network on which the call is to be given.

In accordance with another illustrative embodiment, a system for managing phone calls on a phone device is provided. The system comprises a profile entry component interfacing a user to allow the user to enter and modify profile data. The system further comprises a call management component adapted to read in a phone book an attribute value appended to a phone number and, when the attribute value corresponds to a personal call, to compute according to at least one rule and profile data, a prefix to the phone number the computed prefix being understandable by a phone network on which the phone number call is to be given.

DETAILED DESCRIPTION

The solution of the illustrative embodiments is based on an extension of cell phone capabilities and does not rely on a change in the existing service provided by the phone operators. This extension allows the cell phone user to store a single number in his phone book, e.g. in the standardized international format, and to add an attribute that is used when the call is performed to generate a call with the correct prefix in case of personal call regardless of where the user is located. The user does not need to change his address book to add the business prefix allowing the same number to be used for multiple purposes.

In roaming situations, especially when the cell phone is used abroad the correct prefix for personal call is set by the extension which can deduce this information from a user profile and the localization of the user by a global positioning system (GPS) function. More generally, the call classification is done at the cell phone level and is more dynamic since it may be based on the specific calling time or specific user location (through GPS positioning system) or through an handshaking process with the office building in order to define a call as business or personal.

The fact that the call classification is performed locally may allow the cell phone to optionally create an affinity mechanism that is able to 'parse' the call history to determine if a new number should be classified as business or personal.

Using the proposed extension, the user is able to "tag" an occurred call, according to a drop down list of reasons, directly on his cell-phone before logging information on completed calls. This tagged call information may be used to perform call billing. The "tagging" may simply propose "business versus personal call" but may also propose more articulated chargeback options (e.g., customer A, B, . . . ) according to the policies of the company employing this user.

The capability of distinguishing billing between calls enhances the company to enforce policies based on dynamic criteria. A different company policy will be reflected by a different profile or profile configuration, which will contain the specific data to be sent to the company server for asynchronous reconciliation. For example, assuming the company wants to enforce a policy so that the calls made from a certain country are free, this rule will be applied by adding a profile on top of the profiles list that matches the country from which the call is performed. In the profile is also specified that the GPS has to be active to retrieve the place where the user resides at the time of the call, so that the client plugin, maybe after the call, reminds the user that if he wants that policy to be applied he has to start the GPS feature.

The "personal call prefixing" and "tagging" functions can use suitable default values for the prefix and the tag, which may come from an extra attribute added to all stored phone numbers which represents the phone number group. For instance, all extensions belonging to the "family" group can be tagged as "personal calls" by default. Default tagging can however be overridden by the user at runtime (in the case, for instance where the employee calls a friend for a business reason). Consequently, either a default prefixing and tagging are applied, or the user is allowed to specifically enter them. Optionally, the prefix and tagging may be chosen automatically and the user can be prompted for confirmation.

Finally, call number prefixing and tagging can also be triggered by time or location so that the default will change during the business hours and/or if the user is at the office or at home.

It is noted that the call information logging is done for outbound and inbound traffic because both may be billed in out-of-country roaming situations. The prefix computed by the extension is included in the tag to help providing appropriate accounting, even when the operator prefixing service is not available.

The extension in the company cell phone can be configured with a scheduled "call-home" call, to send tagged call information that occurred in the last period to the company. The company backend billing service can use this tagging information from each employee, to consolidate, properly enrich, and partition the bills received from the cell phone operator, for that specific company cell phone.

The advantages of this solution, compared to the current implementations of cellular phones functionalities, are the following:

- The user can prefix and tag a "business" or a "private" call, depending on the use of the phone, or the specific period of time or situation.
- The user does not have to change all the numbers in his address book every time he wants to define private numbers. He can just select them all together in one operation.
- A number can be private or not depending on the specific situation at the moment of the call, that is the phone call type can be decided dynamically at runtime.
- The company phone can be used for personal purposes abroad without the issues of entering a specific code for the call.
- The managing of calls is not centralized to a central system but it is managed locally by the employee on his cell phone allowing in this way a better accuracy of the user profile information and a greater flexibility and customizability of calls management.
- As the call classification is done at the device level it is more dynamic since it may be based on the specific calling time or specific user location (through the GPS positioning system in the cell phone) or through a handshaking process with the office building in order to define a call as business or personal.
- Putting the computing process at the device side allows device customizations to be easily applied. This not only means that the profiling can be applied to all devices, but that each device can leverage specific customizations without interfering with the remote processing (by a billing server). This adds greater flexibility and dynamicity in the way the various profiles are applied. Assuming the user defines two different profiles and associates them to an address book entry. The attribute of the Phone Book entry which is associated to a general profile will contain two profiles. The general profile contains the common characteristics and the profiles of the list of profiles may contain some specifics to help for customization. If the two profile definitions overlap and their applicability is not statically resolved at definition time, the centralized solution will fail to determine the boundary of each profile. The problem is solved with the solution of the illustrative embodiments because processing at device side is able to correctly resolve the profile boundary at runtime (that is when the call is made) and not later.

Other problems with centralized approach are solved by the solution of the illustrative embodiments: it avoids a possible congestion at remote server side (processing at device side allows a smarter and lightweight processing at server side) without impacting the device performance; it avoids a disk space saturation for the remote server logging activity, since it will be reduced; finally the solution of the illustrative embodiments decreases the network congestion since only a subset of the information required by a centralized approach (the tagged call information) will be queued.

It is noted that the dynamicity of the solution allows the user to configure any of his devices. The same user profile providing characteristics to define the right call prefix and/or the right tag for the logged call information can be used for any other device. The profile may contain the information on how this particular device uses the profile.

Figure 1:
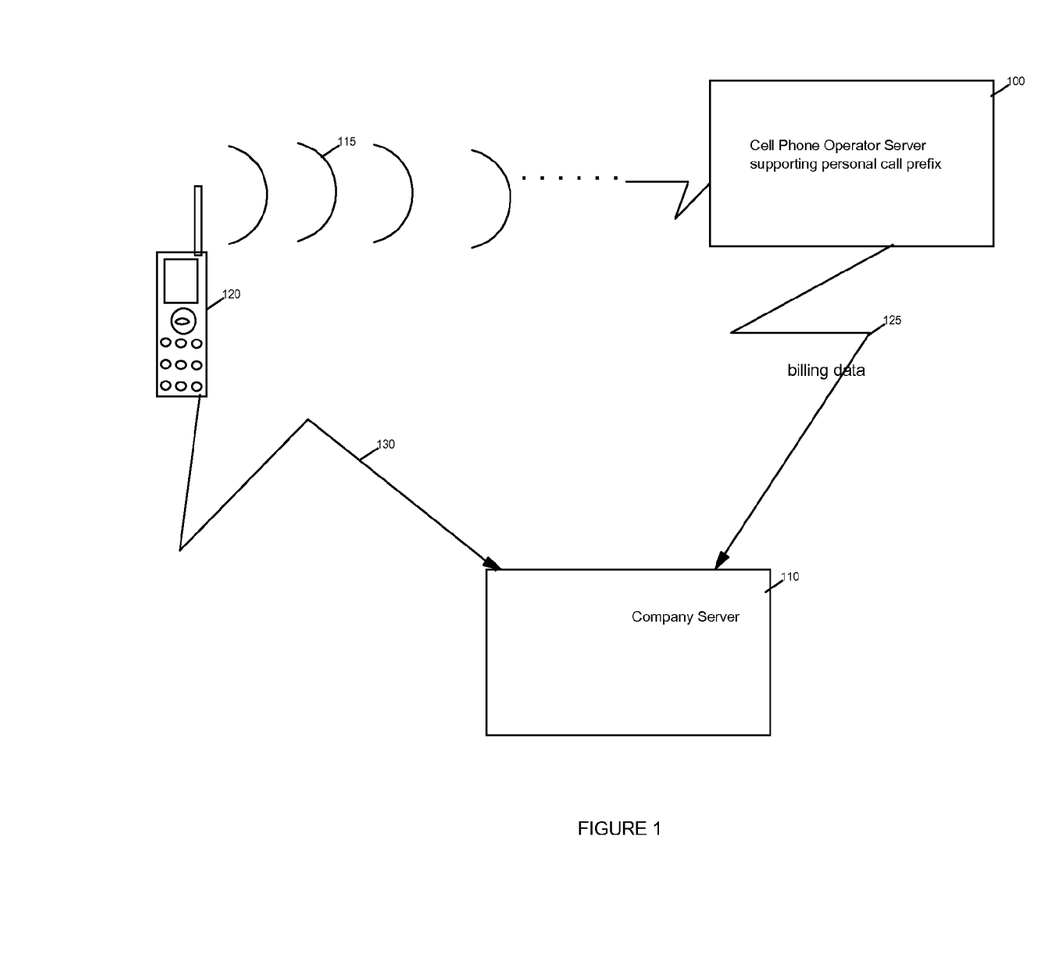
FIG. 1 shows the environment of the invention according to an illustrative embodiment.

FIG. 1 shows the environment of the invention according to an illustrative embodiment. A company provides cellular phones (120) to its employees. It is noted that the illustrative embodiments can be implemented in any other device such as personal digital assistant (PDA) which includes a phone function. Also, as it will be seen in the rest of the document, a device including a navigation function such as with a global positioning system (GPS) can take better advantage of aspects the illustrative embodiments, particularly for phone call number or call accounting determination according to the geographical position. With these phones it is assumed that the employee will make business calls but will also use the phone for personal calls.

According to the illustrative embodiment, the cell phones are able to distinguish between personal and business call to define the correct prefix for personal calls which are supported by most of the phone operators. The phone operator sends the billing information (125) preferably electronically from its cell phone operator server (100) to the company server (110). As the cell phone operator supports personal call prefix, the billing information distinguishes between business and personal calls. On the company server (110) are computed expenses coming from the employee business calls, and the billing information coming from the employee personal calls are routed to the employees.

It is noted that for small companies, the cell phone operator billing information can be done by mail, the expense computing and routing can done manually and not through computing resources. The company can rely on phone operator billing data as the distinction between personal and business call has been done at the phone level and based on the most accurate business profile information entered by the user himself on his cell phone. According to the illustrative embodiment, the cell phone sends asynchronously logged information (130) on calls to the company electronically to the company server.

The cellular phone and company server are both assets of the same company or the 'company server' may be managed by a subcontractor of the company. So, they can communicate in many ways. For instance, the cell phone can use Internet communications for Internet enabled cellular phones. When a user activates his Internet connection, the reconciliation data are automatically sent to the company server via the Internet. One other possibility among other possible ones is through a third company asset communication. The cellular phone can connect via Bluetooth® or infrared data association (IrDA) to a third company device at the office or at user home, like for example a user laptop. The user can also leverage the same laptop to upgrade the cellular phone software, so in this case the laptop acts as a bridge towards the company server. BLUETOOTH is a trademark of the Bluetooth Special Interest Group (Bluetooth SIG) in the United States or other countries.

According to the illustrative embodiment, call information are tagged before logging in the cell phone with data providing accounting information that is based on profiles entered by the user in his cell phone and optionally confirmed by the user when the call is performed. As usual the (tagged) call information is logged when the call is complete in the phone. The logged call information tags sent from the employee cell phone provides accounting information to the company server: using the call information tagging, the company can distinguish between personal and business calls and between different accounts for customer business calls. The company can use this information to consolidate with billing from the phone operator and for dispatching business information to the different customer accounts. If a small company is able to receive logged information (130) on calls sent electronically by the cell phones, it can even manually consolidate this data with the billing data sent by mail by the phone operator and manually dispatch expenses to different business accounts.

Figure 2:
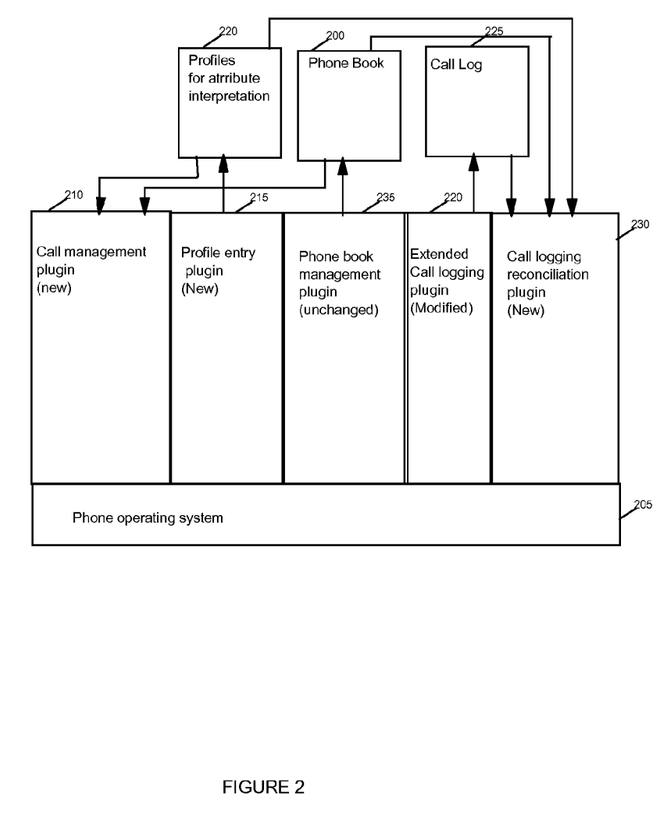
FIG. 2 illustrates the logical components of a cell phone implementing aspects of the illustrative embodiment.

FIG. 2 illustrates the logical components of a cell phone implementing aspects of the illustrative embodiments. In the illustrative embodiment the implementation is done through plugins (210, 215, 220, 230) in the cell phone. Preferably, the plugins are software plugins implemented as a software layer above the cell phone operating system (205). The user enters phone numbers in the phone book (200) using the phone book management plugin (235) as already existing in the cell phone. However, with the illustrative embodiment, the phone numbers are enhanced with a new attribute specifying that the call is either 'personal', 'business' or 'both'.

A call management plugin (210) is triggered when the user gives a call by choosing, for instance, a number in the phone book. A first function of the call management plugin is to provide, if necessary, a modified number for the call. A second function of the call management plugin is to generate a tag according to the result of the above mentioned analysis. Also the existing call logging plugin (235) of the cell phone is modified to be able to log in the call log (225) at the end of the call, a tag appended to the usual call information (such as call duration), generated by the call management plugin.

A new plugin, the profile entry plugin (215), allows the user to enter and update a profile or a set of profiles (220) associated to each attribute appended to the phone number in the phone book. A profile describes some employee data for applying rules defined at the company level for computing a new phone number and a tag to be appended to a call information logged by the cell phone. The call management plugin uses the profile information to compute a new phone, if necessary and prepare a tag for further call billing to be appended to the call information logged in the phone when the call is complete. The new phone number and the tag for further call billing are computing by the call management plugin implementing the rules of the company and using Profiles entered by the cell phone user.

The profile reflects the last updated user information. To be sure it is the last update, in the preferred embodiment, the user is asked to confirm that the call management computations are correct. The optional call logging reconciliation plugin (230) is periodically activated in an asynchronous way to send call log information from the call log file (225) to a server of the company the user is employed in as described in more details in FIG. 3. Optionally, the phone book (200) and profile information (220) associated to each called phone number can also be sent.

The implementation of the illustrative embodiment with cell phone plugin is one embodiment. The person skilled in the art can adapt the teaching of the embodiment as described in FIG. 2 to an environment in which the call management, profile entry and storing, and call logging consolidation functions are not performed on the phone cell but on an independent device able to access the phone book and the call log and can communicate with the call logging. The independent device can be a computer, for instance the computer of the employee.

Figure 3:
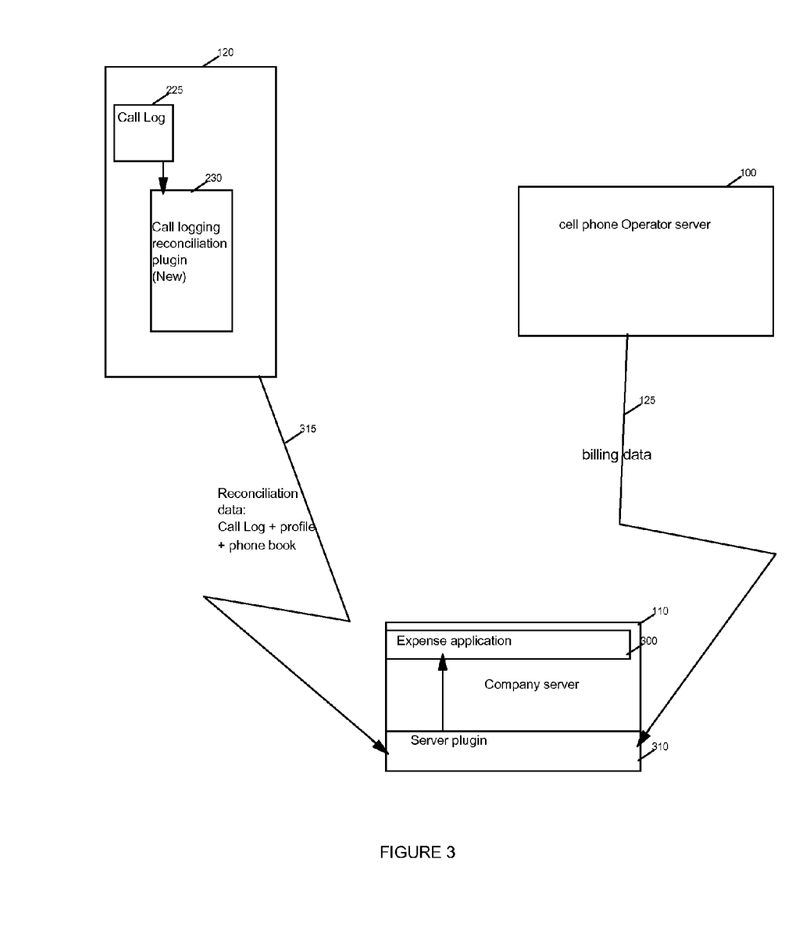
FIG. 3 illustrates the exchange of information of the billing and reconciliation phases according to an illustrative embodiment.

FIG. 3 illustrates the exchange of information of the billing and reconciliation phases according to an illustrative embodiment. The company server (110) may receive electronically billing data (125) from the phone operator server (100) and the reconciliation data (315) sent by the cell phone. The billing data from the operator reflects the employee personal and business use of the cell phone optionally detailed by called phone number. The reconciliation data contains detailed information on each phone number and tags for more detailed identification.

A server plugin (310) uses these information for reconciliation between operator and employee cell phone billing. Using the tags, the server plugin computes the detailed business billing per account and provides this information to the global expense software application (300) of the company for further processing. More particularly, the expense application will be able to reroute to the employees their cell phone billing for personal call. The phone book entries with phone business numbers and the user profile which are optionally sent by the employee cell phone can be received by the company server and stored at the company level because they represent the most updated employee business profile information.

Figure 4:
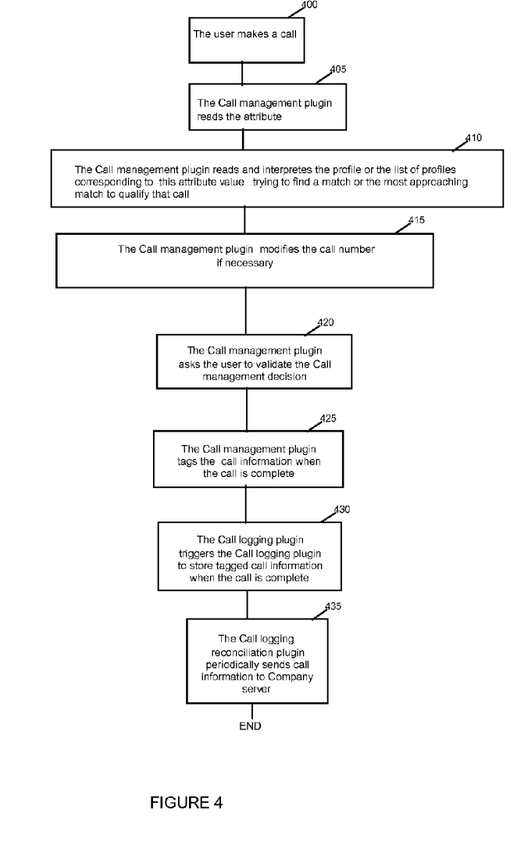
FIG. 4 is a first part of a general flowchart of the exchange of information of the billing and reconciliation phases according to an illustrative embodiment.

FIG. 4 is a first part of a general flowchart of the exchange of information of the billing and reconciliation phases according to an illustrative embodiment. When a user makes a call (400) the call management plugin is triggered: it first reads (405) the attribute appended to the call number in the phone book. Then, in the following step, the call management plugin reads the general profile or the set of profiles associated to the attribute value which has been read. The call management interprets (410) the general profile or the set of profiles by testing the rules it implements using the profile data.

For example a rule could be "time of the call is in working hours". The plugin takes the first profile and evaluates it according to the rules that are specifically applied to this profile. If there is an exact match, that is, the profile matches exactly all the rules, the profile is used for the call. If there is not an exact match, the first profile is given a score that by default is computed as the percentage of the satisfied rules, but can be customized. Then, the next profile is taken and evaluated following the same criteria, until either an exact profile is found, or there is no other profile to take from the list.

In the illustrative embodiment, if there is no profile exactly matching, the profile with highest score is chosen, and if there is more than one profile with the same score, the first of them is chosen. At the end of this process the plugin will always have one profile to apply for the call, but the way this profile is determined adds flexibility (simply changing the order of profiles in the general profile will cause a different policy to be applied), customizability, and dynamicity since the profile choice is made at runtime, for each call. It is noted that there are many possible variations in the call management plugin algorithm to implement the company rules to be applied, each corresponding to an embodiment of the invention.

Once the attribute value has been interpreted by the call management plugin with the profile(s), the call management plugin is able to apply the rule, for instance, to change the calling phone number (415) of a personal call. One example is when the call is qualified as personal and a profile specifies that the prefix depends on the location of the user for international call. Applying the profile, the call management plugin either triggers the GPS of the phone device or applies further rules using the profile data providing, for instance which country prefix is to be applied for which period of time for the user. In the preferred embodiment, the call management plugin asks the user to validate the decision (420). This step may be optional but is however recommended for a better accuracy of the information coming from the user. By this validation step, the user can realize he has to correct an error entered in the profile or the phone book or to refresh these information.

After the call is complete, the call management plugin computes the tag (425) to be appended to the call information by the call log plugin. The tag is computed according to the profile data and the company rules. In case the call is a personal call, the prefix which has been used for the call is part of the tag. In any case for personal calls the tag mentions the call as 'personal' so that each time a phone operator sends phone call billing without distinguishing between business and personal call, this information is anyhow made available and logged by the cell phone. In the tag can be introduced also detailed accounting per user or other accounting specificity required by the company. The call management plugin triggers the call logging plugin which stores the tagged call information when the call is complete (430).

Periodically, a call logging reconciliation plugin sends the tagged call information to the company server (435). In the illustrative embodiment this information is sent electronically. The company can use the tagged information to retrieve phone billing and account data in line with the company rules.

Figure 5:
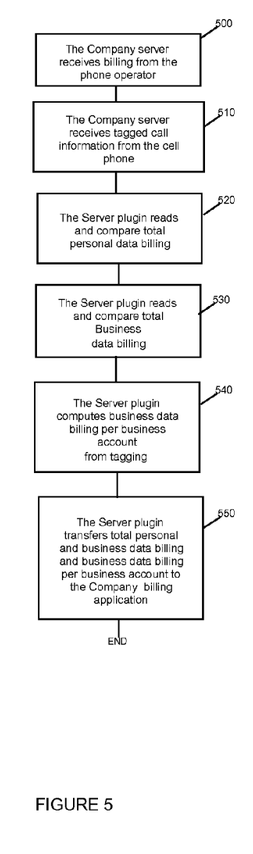
FIG. 5 is the second part of the general flowchart of the exchange of information of the billing and reconciliation phases according to an illustrative embodiment.

FIG. 5 is the second part of the general flowchart of the exchange of information of the billing and reconciliation phases according to an illustrative embodiment. The flowchart of FIG. 5 describes the steps implemented in the company server to prepare billing and accounting for the company. In the illustrative embodiment a server plugin of the company server receives (500) phone call billing from the operator. In most of case the operator is able to distinguish between the personal and business calls because the personal call prefixing service is supported by the phone network. Exceptionally, if this personal call prefixing service is not supported by a phone operator, the company will receives billing for which there is no split between business and personal call. In parallel, in the illustrative embodiment, the company receives (510) electronically periodical tagged call information from the cell phone of its employees. The per call information contains usual call information logged by all the cell phone devices but also the tag created by the call management plugin and appended to the call information. The tag provides more details on the call in relation with the employee profile which has been used. The information is used to consolidate billing for phone calls received from the phone operators. It is noted that the phone call billing involves more than one phone operator when the employee travels in different countries for instance or in any case where roaming activated by the cell phone. The company server reads the tagged call information and compares with the phone operator billing for consolidation of the personal calls (520) and the business calls (525). The consolidation for personal and business calls are independent and can be done in any order (520, 530 or 530, 520). In the case where an operator has not distinguished in the phone call billing between personal and business call because this service is not supported, the company server can restore this information from the call information tag.

The tag for business calls provides the details corresponding to the rules and the user profile data: in the tag, the company can retrieve, for instance, the information concerning business calls given by the employee for one specific company customer. For a same customer the tag may contain information on which type of call for the customer: for maintenance purpose, for pre-sale activity, etc. The server plugin can compute (540) this data and send (550) the resulting data to a billing application for the company: the company billing application can reroute to the employee their expenses corresponding to billing of their personal calls. The company billing application can split expenses per account for a future use by the company financial reports.

Figure 6:
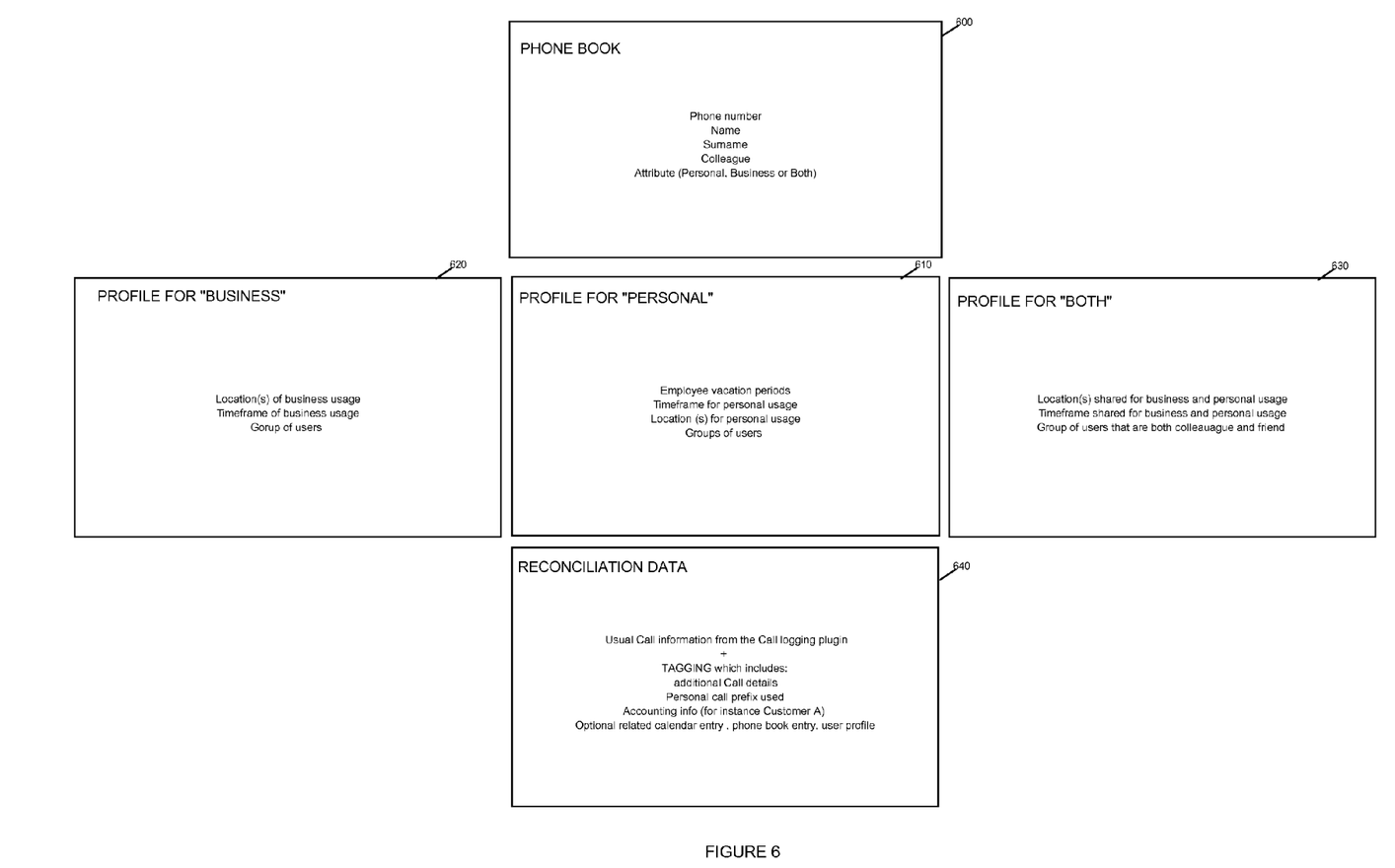
FIG. 6 is an example of phone book entry, profile entry and reconciliation data according to an illustrative embodiment.

FIG. 6 is an example of phone book entry, profile entries, and reconciliation data according to an illustrative embodiment. A phone book entry (600), according to the illustrative embodiment includes on top of the usual phone number and name, surname entered by the user and stored by the phone book plugin, a name of colleague (business collaborator) and the an attribute value which may be "Personal", "Business" or "Both". If the "Both" value is used in the illustrative embodiment, the same principle can apply without this value. This attribute acts as an index for a second level of processing by the cell phone allowing customizable information to be entered. As explained sooner in the document, still using the same second level processing of the invention, an extra attribute can be added to all stored phone numbers which represents the phone number group. For instance, if the attribute value is "family", all call numbers belonging to the "family" group can be tagged as "personal calls" by default by the call management plugin.

The existing phone book plugin providing an interface for the user to make his phone book entries and to choose a call number for calling is just modified to add more information.

An example of profile entry corresponding to the "Personal" attribute (610) comprises at least one general profile comprise general data applicable to all detailed profiles associated to the profile entry if they exist. In FIG. 6 a unique general profile is represented but the person skilled in the art following the teaching of the description of FIG. 6 can easily adapt the call management plugin to support more profiles. The Call management plugin is adapted to ask the user to enter the profile entries. As said before, this profile information is used when the user gives a call to add a prefix if necessary and when the call is complete this information is used to prepare a tag to be logged with the call information and to provide more details for billing. The general profile entry sample of FIG. 6 (610) comprises the employee vacation periods and timeframe for personal usage. This information is known and regularly refreshed by the user. It will be used by the call management for instance to help in distinguish between personal and business calls. The location(s) for personal usage will be used for instance by the Call manager to define the correct personal call prefix to be used in the phone network. The groups of users may be "family" as explained sooner in the document.

An employee profile is used by the call management for applying the underlying billing and accounting policies of the company. For instance, if a profile includes "timeframe for personal usage" the underlying rule is to apply personal call prefix if the call is done during personal usage timeframe.

Not represented in this figure, a set of profiles can be added to such a "personal" general profile entry. The set of profiles may describe similar information related to personal calls but with more detail. The call management plugin when a call is performed has to find the profile corresponding to the current situation for the call. The call management algorithm may select the 'most matching' profile and applies the underlying rules. The algorithm of the call management to find the matching profile is done according to the company strategy: it could apply the 'most matching profile'. Any variation of the algorithm is however in the same scope of the invention.

In FIG. 6, an example of profile entry corresponding to the "Business" attribute (620) may comprise the location for the business usage: this information will be tagged to the call information for further usage by the company for establishing split of expenses. The timeframe for business usage can includes details to differentiate business for different customers. The groups of user entry may be used later on for accounting purpose.

An example of profile entry corresponding to the "Both" attribute (630) may comprise the location, timeframe, and group of users shared for business and personal usage. It may happen that a person is a friend of the employee that he calls during his personal time but the same person may be a colleague and can be called on the same phone number or a different phone number for business reasons. The "Both" value attribute which is used in the illustrative embodiment is optional. It may happen that there will be no intersection between these two activities. The person skilled in the art can add processing of this additional attribute value in a similar way as for "Personal" and "Business".

It is noted that with the indexing with attributes and the use of profiles, the call management plugin is very flexible and can adapt to any company billing/accounting rule.

An example of reconciliation data (640) sent by the call logging reconciliation server to the company server is also provided in FIG. 6. In this example, the data contains the usual call information (call number, date of call, etc.) logged by the call logging plugin when a call is complete. The extended call logging plugin of the illustrative embodiment tags this information with new information on the call provided by the call management plugin. The additional call details may include call duration which will be used later on to consolidate with the billing information provided by the phone operators. The prefix used will help to distinguish between personal and business calls. A specific prefix value may be entered by the call management plugin to indicate that the call was personal but the phone operator does not support the personal call prefixing service. Accounting information is computed by the call management plugin by reading the details in the employee business profile to assign a customer name and/or accounted special activity to a call. Optionally, the tagged information can include some phone book entries and/or profile entries if they are required by the company. In this way, the company may acquire the most accurate information on the employee (fresher than the information stored in the company databases accessed by the employee).

The invention claimed is:

1. A method, in a cellular telephone device, for managing phone calls made using the cellular telephone device, said method comprising:
   reading in a phone book a phone type attribute value associated with a phone number selected for making a phone call;
   reading profile data from at least one profile associated with the phone type attribute value;
   applying at least one rule to the profile data;
   responsive to determining the phone type attribute value corresponds to a personal call, automatically prefixing the phone number selected for making the phone call with a prefix determined according to the at least one rule and the profile data to form a modified phone number, wherein the prefix is understandable by a phone network on which the phone call is to be made;
   initiating, by the cellular telephone device, the phone call on the phone network using the modified phone number, and
   tagging call information stored by the cellular telephone device responsive to the phone call being completed with additional information including a classification that corresponds to a personal call or a business call and additional information extracted from the profile on which the at least one rule has been applied.

2. The method of claim 1, further comprising:
   the phone network distinguishing the phone call between a personal call and a business call in call billing information sent to a phone device owner location by use of the prefix or phone call type attribute.

3. The method of claim 1, wherein the prefix is determined by taking into account a location of the cellular telephone device by using a global positioning system.

4. The method of claim 1, further comprising:
   for each profile associated to the attribute value which is read:
   testing applicability of the profile data to the at least one rule;
   repeating the testing applicability of the profile data to the at least one rule until a profile with highest test result is selected; and
   performing the applying the at least one rule to the profile data with the profile having the highest test result.

5. ; The method of claim 1, further comprising:
   electronically transferring the tagged call information to a remote location.

6. The method claim 1, further comprising:
   the remote location receiving call billing information from the phone network;
   the remote location consolidating the call billing information with the tagged call information; and
   the remote location using the tagged call information to extract and compute call billing business information per phone device user account and to reroute expenses for personal calls to a corresponding phone device users.

7. The method of claim 1, further comprising:
   interfacing a user to allow the user to enter or update profile data.

8. A computer program product comprising a non-transitory computer readable storage medium having programming code instructions stored thereon, wherein the programming code instructions, when executed on a cellular telephone device, cause the cellular telephone device to:
   read in a phone book a phone type attribute value associated with a phone number selected for making a phone call;
   read profile data from at least one profile associated with the phone type attribute value;
   apply at least one rule to the profile data;
   responsive to determining the phone type attribute value corresponds to a personal call, automatically prefix the phone number selected for making the phone call with a prefix determined according to the at least one rule and the profile data to form a modified phone number, wherein the prefix is understandable by a phone network on which the phone call is to be made;
   initiating, by the cellular telephone device, the phone call on the phone network using the modified phone number, and
   wherein the programming code instructions further cause the phone device to:
   tag call information stored by the phone device when the call is complete with additional information including a classification which corresponds to a personal call or a business call and additional information extracted from the profile on which the at least one rule has been applied.

9. The computer program product of claim 8, wherein the phone network distinguishes the call between a personal call and a business call in call billing information sent to a phone device owner location.

10. The computer program product of claim 8, wherein the prefix is determined by taking into account a location of the cellular telephone device by using a global positioning system.

11. The computer program product of claim 8, wherein the programming code instructions further cause the phone device to:
    for each profile associated to the attribute value which is read:
    test applicability of the profile data to the at least one rule;
    repeat the testing applicability of the profile data to the at least one le until a profile with highest test result is selected; and
    perform the applying the at least one rule to the profile data with the profile having the highest test result.

12. The computer program product of claim 8, wherein the programming code instructions further cause the phone device to:
    electronically transfer the tagged call information to a remote location.

13. A cellular telephone device, said system comprising:
    a processor; and
    a memory coupled to the processor, wherein the memory comprises instructions which, when executed by the processor, cause the processor to manage phone calls on the phone device, the instructions comprising:
    a profile entry component interfacing a user to allow the user to enter and modify profile data;
    a call management component adapted to read in a phone book an attribute value associated with a phone number selected for making a phone call; read profile data from at least one profile associated with the phone type attribute value; apply at least one rule to the profile data; responsive to determining the phone type attribute value corresponds to a personal call, automatically prefix the phone number selected for making the phone call with a prefix determined according to the at least one rule and the profile data to form a modified phone number, wherein the prefix is understandable by a phone network on which the phone call is to be made; and initiate, by the cellular telephone device, the phone call on the phone network using the modified phone number, and tagging call information stored by the cellular telephone device responsive to the phone call being completed with additional information including a classification that corresponds to a personal call or a business call and additional information extracted from the profile on which the at least one rule has been applied.

14. The cellular telephone device of claim 13, further comprising:

the call management component being adapted to compute a to be appended to the call information created and stored by the cellular telephone device call logging component;

a call logging component being adapted to receive information from the call management component and to use the information to tag the call information created at the end of each call; and a call log reconciliation component adapted to send to an external location the tagged call information.

15. The cellular telephone device of claim 14, wherein the call management component, the call logging component, and the call log reconciliation component are software plugins running on top of an operating system of the cellular telephone device.

16. The cellular telephone device of claim 13, wherein the prefix is determined by taking into account a location of the cellular telephone device by using a global positioning system.

17. The cellular telephone device of claim 13, wherein the instructions further cause the processor to;

for each profile associated to the attribute value Which is read:

test applicability of the profile data to the at least one rule;

repeat the testing applicability of the profile data to the at least one rule until a profile with highest test result is selected; and perform the applying the at least one rule to the profile data with the profile having the highest test result.

* * * * *